A. MONARD.
WATER METER WITH REVOLVING PISTON.
APPLICATION FILED MAR. 14, 1910.
1,026,992.
Patented May 21, 1912.
3 SHEETS—SHEET 1.
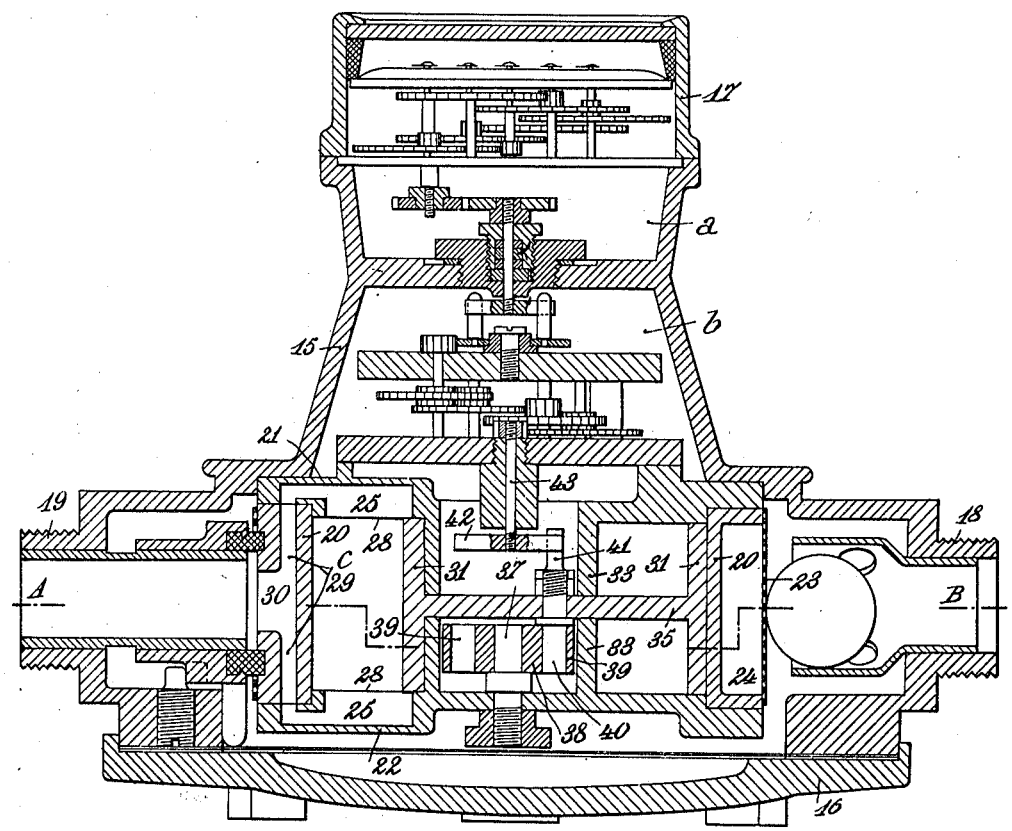
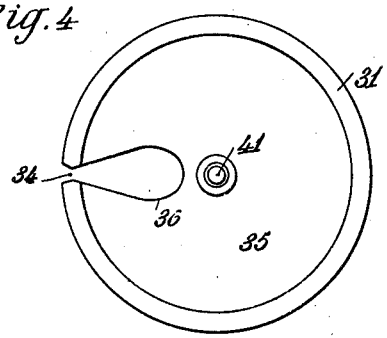

A. MONARD.
WATER METER WITH REVOLVING PISTON.
APPLICATION FILED MAR. 14, 1910.

1,026,992.

Patented May 21, 1912.
3 SHEETS—SHEET 2.

Witnesses
J. Rabinowitz
E. Schallinger

Inventor
Alfred Monard
By B. Singer
Atty

A. MONARD.
WATER METER WITH REVOLVING PISTON.
APPLICATION FILED MAR. 14, 1910.

1,026,992.

Patented May 21, 1912.

3 SHEETS—SHEET 3.

Witnesses
J. Rabinowitz
E. Schellinger

Inventor
Alfred Monard
by B. Singer
Atty

UNITED STATES PATENT OFFICE.

ALFRED MONARD, OF PARIS, FRANCE.

WATER-METER WITH REVOLVING PISTON.

1,026,992.　　　　　Specification of Letters Patent.　　Patented May 21, 1912.

Application filed March 14, 1910.　Serial No. 549,197.

*To all whom it may concern:*

Be it known that I, ALFRED MONARD, a citizen of the French Republic, and resident of Paris, France, have invented certain new and useful Improvements in Water-Meters with Revolving Pistons, of which the following is a specification.

This invention relates to a water meter with revolving pistons characterized by the particular distribution insuring the perfect tightness of the joint between the revolving piston and the wall of the piston cylinder and further the perfect equilibrium of pressure on both faces of said piston.

In the accompanying drawings the invention is shown by way of example.

Figure 2:
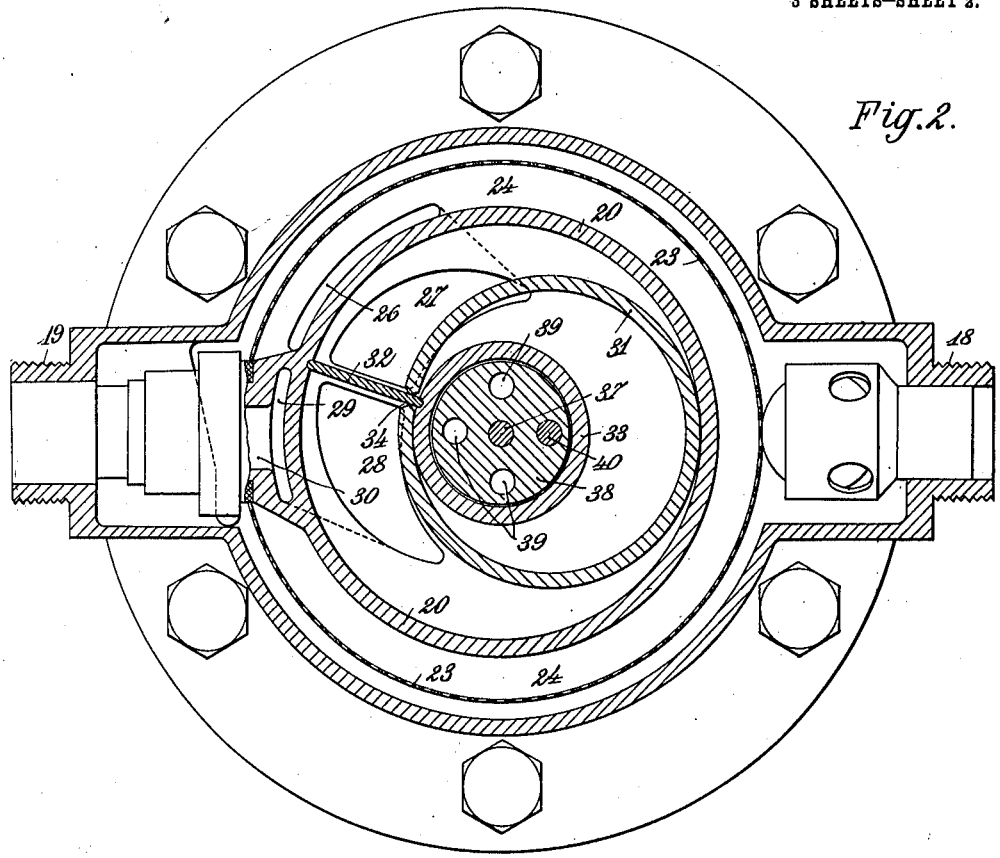
Figure 3:
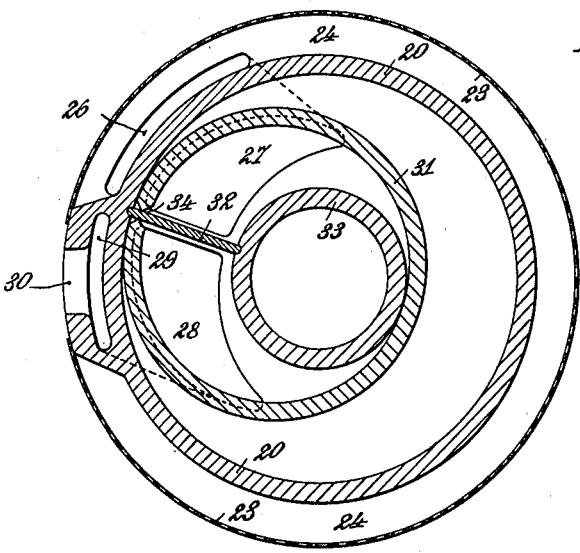
Figure 7:
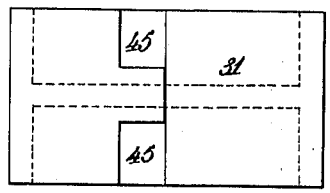
Figure 6:
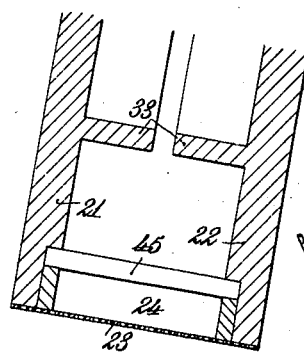
Figure 5:
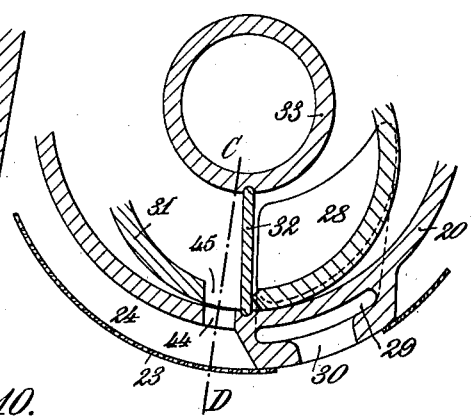
Figure 10:
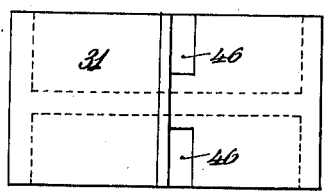
Figure 8:
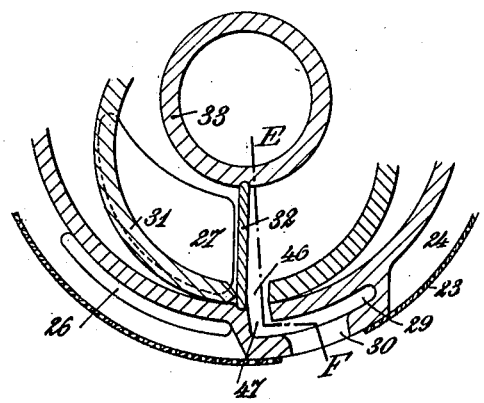
Figure 9:
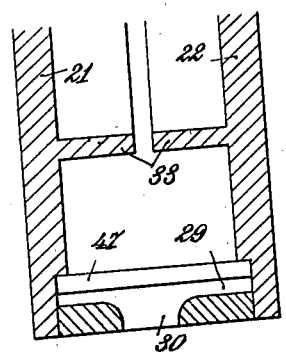

Figure 1 shows the water meter in vertical section. Fig. 2 is a horizontal section on line A—B of Fig. 1. Fig. 3 is a horizontal section of part of Fig. 1 showing the piston in another position. Fig. 4 is a plan view of the piston. Fig. 5 shows part of the device in horizontal section and in another form of execution. Fig. 6 is a cross section on line C—D of Fig. 5. Fig. 7 shows the piston represented in Fig. 5 in side elevation. Figs. 8, 9 and 10 represent a third form of execution in views similar to those shown in Figs. 5, 6 and 7 respectively.

The water meter consists of a cylindrical envelop which incloses all the parts of the apparatus; it is closed at the bottom by a plate 16 and at the top by a lid 17 and divided into three superposed compartments.
The upper compartment *a* covered by the lid 17 having a window contains the dials and hands which indicate the registered quantity of water which has flowed through the apparatus; the middle compartment *d* incloses the train of wheels, which will not be described as they may be of any of the well known constructions, this part of the meter forming no part of the invention. The lower compartment *c* incloses the mechanism operated by the water which flows through the meter. 18 is the water inlet and 19 the water outlet arranged at the opposite end of the apparatus as the inlet. In said lower compartment *c* a cylindrical box 20 is located which is closed by a lid 21 and a bottom plate 22. Said box 20 is surrounded by a cylindrical wall 23 which is perforated or made of metal gauze forming a large cylindrically perforated tube through which the water has to pass before it gets into the annular chamber 24, the impurities and gross admixtures of the water which could be prejudicial for the proper working of the meter, being retained by said wire gauze. The water flows into said box 20 through channels provided in the bottom plate 22 and in the top plate 21 and flows out of said box through similar channels. In the vertical section Fig. 1 there are only shown the outflow channels 25. The inlet channels are absolutely similar. Fig. 2 shows clearly the inlet opening 26 outside the box 20 and the orifice 27 for admission to said box, both openings being in the bottom plate 22, identical openings being provided in the top plate just above the openings shown. The water flows out of the cylindrical box 20 through the orifice 28 and the channels 25 which communicate with a vertical conduit 29 whose orifice 30 stands opposite the outlet pipe 19. The orifices 28 and 27 are of special shape shown in Fig. 2 in plan view. The shape of said orifices is such that the revolving piston 31 in one of its end positions completely covers the outer edges of the two pairs of orifices, as shown in Fig. 3, while in its other end position it covers the other, inner edges, that is to say those which are near the center, the four orifices being completely free. Said orifices must not communicate the one with the other and with this object in view they are separated by a vertical partition 32 radially arranged in said box 20 and reaching from the inner wall of said box to the outer wall of two superposed cylindrical sleeves 33 cast in one piece with the lid 21 and bottom plate 22 respectively and bent inwardly and outwardly at the same diameters. These sleeves form guides for the inner wall of the revolving piston 31. This piston 31 consists of a cylindrical shell open along one of its generating lines so that a slot 34 is formed with which said partition 32 engages. The piston 31 has at the middle of its height a horizontal membrane 35 which has a notch 36 corresponding with said slot 34 and curved so that it always bears with one of its points against the partition 32 when the piston is being propelled.

At the center of the bottom plate 22 a vertical shaft 37 is fixed around which a disk 38 turns freely. This disk 38, which is of convenient thickness, is made of ebonite and perforated by four equidistant holes 39, with any one of which holes an axle 40 can engage which is fixed at the center of the membrane 35 of the piston 31 and which has at its upper end an arm 41 destined to operate a cross pin 42 fixed in the lower end of the shaft 43 of the train of wheels actuated by the piston.

The water which flows in through the inlet tube 18 traverses the wire gauze 23 and fills the annular chamber 24 to flow into the box 20 through the openings 26 and orifices 27. Suppose the piston 31 to be at the beginning of one of its operations, that is to say, in the position shown in Fig. 3, the water will first fill the curved space limited by the inner wall of the piston 31, the outer wall of the sleeves 33 and one of the faces of partition 32. The pressure of the water displaces the piston which thus begins to operate. At the beginning of its operation the two generating lines of the outer cylindrical surface of the piston which form the vertical edges of the slot 34 are in perfect contact with the inner wall of chamber 20 so that any leakage from the interior of the piston to its exterior is prevented. As soon however as the piston begins to be displaced it uncovers the outer edge of orifice 27 and the water flows through this orifice to the outside of the piston and fills the space which is comprised between the inner wall of the box and the outer wall of the piston. During this time the outlet orifice 28 has also been uncovered and the water flows from the box 20 out through this orifice, the conduit 29, the orifice 30 and the outlet pipe 19, the water from the interior of the piston flowing also out through this orifice 28 so that the piston is perfectly equilibrated in the water whose pressure acts equally on all the points of its outer and inner surfaces, as the streams of water entering the upper and lower inlets acting upon the outside of the crown of the piston balance one another by exerting in the cylinder pushing efforts of opposite directions which annul each other. The inlet or admission currents when acting inside the piston, exert upon the membrane of the piston equal efforts which are directed in opposite directions insuring thus a perfect equilibrium of the piston. The piston being thus balanced is exposed practically only to a molecular pressure which permits it to be made of ebonite, a rather fragile material, which, should there be any great resistance to movement, reduces the friction between parts, a feature which is particularly valuable in this kind of machines.

According to the modified construction shown in Figs. 5, 6 and 7, the outlet device is identical with that which has just been described, the admission is however simplified as it consists only of a lateral opening 44 which corresponds with similar openings 45 of the revolving piston 31. This construction however does not offer the same exactness as the foregoing construction as it evidently is practically impossible to bring at the beginning of each operation in contact with the inner wall of the box 20, that generating line of the piston 31 adjacent to the partition 32, at the outlet side, and the opposite edge of the orifice 45. Herefrom follows a more or less important leakage as can be easily seen from Figs. 5 and 7.

The modified construction shown in Figs. 8, 9 and 10, has a similar admission as described with reference to Figs. 1 to 4, but the outlet consists of orifices 46 arranged in the wall of piston 31 at that side thereof adjacent the egress side of the partition 32 and communicating with similar orifices 47 which terminate in the vertical conduit 29. This arrangement is the reverse of that which has been described with reference to Figs. 5 to 7 and presents the same degree of inaccuracy, which although being not very important renders this form of construction less reliable than the first and originally described form of execution.

With the two last described modes of execution the orifices 27 and 28 exist only at the one or the other side of the partition, as will be easily understood, because the admission or the outlet respectively is not affected above or below the revolving piston but at the side of the same.

I claim:—

A water meter comprising in combination, a main casing provided with inlet and outlet ports, an annular piston casing within said main casing, a wall dividing said piston casing transversely, a piston, relatively smaller than and disposed within said piston casing, having a diaphragm dividing the same into upper and lower chambers and an aperture about the said wall and adapted to permit movement of the said piston within said piston chamber in liquid tight engagement, the said inlet port of said main casing being in communication with said piston casing at one side of said wall and above and below the said diaphragm of said piston, and the said outlet port of said main casing being in communication with said piston casing at the opposite side of said wall from the said inlet, and above and below the said diaphragm of said piston, a movable member pivotally carried by said main casing concentric to the said annular piston casing and subjacent to said piston diaphragm, a second movable member pivotally carried by said main casing concentric to said annular piston casing superjacent to said diaphragm, and a pin carried concentrically by said piston diaphragm and operatively connected to said movable members to movably guide said piston within peripheral contact with said piston cylinder, and to impart movement to said movable members, substantially as and for the purpose set forth.

In witness whereof I have hereunto set my hand in the presence of two witnesses.

ALFRED MONARD.

Witnesses:
 H. C. COXE,
 JULIN TAVERNE.